United States Patent [19]

Inagaki

[11] 4,418,395
[45] Nov. 29, 1983

[54] DIGITAL DATA PROCESSING SYSTEM WITH A VALUE SETTING UNIT FOR PROTECTING AND CONTROLLING AN ELECTRIC POWER SYSTEM

[75] Inventor: Junichi Inagaki, Fuchu, Japan

[73] Assignee: Tokyo Shibaura Denki Kabushiki Kaisha, Kawasaki, Japan

[21] Appl. No.: 129,647

[22] Filed: Mar. 12, 1980

[30] Foreign Application Priority Data

Mar. 28, 1979 [JP] Japan .................. 54-36738

[51] Int. Cl.³ .......................................... G06F 15/56
[52] U.S. Cl. ............................. 364/900; 364/492; 364/582; 364/744; 361/78; 361/90; 324/76 R; 307/31
[58] Field of Search ... 364/200 MS File, 900 MS File, 364/582, 744, 748, 771, 710, 711, 107-115, 120, 431, 464, 492, 493; 235/92 VA, 92 MT, 92 DN, 92 CV, 92 DP; 340/748, 750; 307/31, 35, 39; 361/62, 64, 68, 78-81, 82, 90-93; 324/52, 76 R

[56] References Cited

U.S. PATENT DOCUMENTS

| | | | |
|---|---|---|---|
| 3,639,734 | 2/1972 | Kimura et al. | 235/92 EA |
| 3,691,358 | 9/1972 | Angelov et al. | 364/744 |
| 3,786,480 | 1/1974 | Hatano et al. | 364/748 |
| 3,855,456 | 12/1974 | Summers et al. | 364/492 |
| 3,987,416 | 10/1976 | Vandierendonck et al. | 364/900 |
| 4,001,566 | 1/1977 | Stevenson | 364/744 |
| 4,077,061 | 2/1978 | Johnston et al. | 364/493 |
| 4,100,600 | 7/1978 | Miles | 364/710 |
| 4,120,583 | 10/1978 | Hyatt | 364/107 |
| 4,125,782 | 11/1978 | Pollnon, Jr. | 364/493 |
| 4,153,936 | 5/1979 | Schmitz et al. | 364/493 |
| 4,216,384 | 8/1980 | Hurley | 307/35 |
| 4,224,506 | 9/1980 | Coppola et al. | 235/92 DP |
| 4,228,511 | 10/1980 | Simcoe et al. | 364/493 |
| 4,242,675 | 12/1980 | Boone et al. | 340/711 |
| 4,261,037 | 4/1981 | Hicks | 364/464 |
| 4,313,169 | 1/1982 | Takagi et al. | 364/492 |
| 4,328,551 | 5/1982 | Yamaura et al. | 364/492 |

Primary Examiner—James D. Thomas
Assistant Examiner—Archie E. Williams
Attorney, Agent, or Firm—Oblon, Fisher, Spivak, McClelland & Maier

[57] ABSTRACT

A digital data processing system for protecting and controlling an electric system, wherein plural data values indicative of system limits are generated and supplied to a processing unit for processing thereof. The data values are converted to digital signals and stored in a digital memory at addresses selected by an address designation unit. Each memory address has associated therewith a predetermined decimal point position. Addresses from the address designation unit are converted to decimal point display signals which can be stored in the memory and used by the processing unit to determine the decimal point position during processing of the data signals stored in the memory.

8 Claims, 14 Drawing Figures

DIGITAL DATA PROCESSING SYSTEM WITH A VALUE SETTING UNIT FOR PROTECTING AND CONTROLLING AN ELECTRIC POWER SYSTEM

The present invention relates to a digital data processing system for performing arithmetic/logic processing by using a digital computer and, more particularly, to a digital data processing system for processing the setting of numerals representing many factors for protection and control of the relevant system.

Highly improved, small-sized modern computers such as mini-computers and microcomputers are used for the protection and control of a system mainly because the computers are small in size and a combination of programs enables a single processor to process many factors.

By convention, numerical values to be set for protecting and controlling a system are applied to numerical data input units which are provided for each individual factor necessary for system protection and control. The values set in the numerical data input units are then applied to a computer. The range of the numerical values to be set are different for each factor, so that the number of places and the positions of the decimal points of the numerical values to be set are different for each numerical data input unit.

A distance protection unit for protecting a power transmission line, for example, has 20 to 30 numerical values for the factors necessary for protection of the power transmission line, such as current, voltage, impedance and time. Each numerical value to be set ranges from $10^{-2}$ to $10^2$ inclusive. It is for this reason that a numerical data input unit must be provided for each factor, with the number of digits and the position of the decimal point peculiar to that particular factor. The necessity of increasing the value of the number in some of the numerical data makes it difficult to keep the size of the whole digital processing unit small, although miniaturization of the arithmetic operation unit is allowed.

However, the many numerical data input units may be replaced by a single numerical data input unit, if the latter is able to handle a wide range of numerical data from $10^{-2}$ to $10^2$, for example, for the numerical data setting purpose. This scheme, however, has new additional problems due to increasing the bit length of the numerical data to be set and enlargement of the memory capacity of the memory for storing the numerical data set.

Accordingly, an object of the invention is to provide a digital data processing system capable of setting numerical data representing the many factors necessary for a system's protection and control by using a single numerical data input unit.

Another object of the invention is to provide a digital data processing system capable of setting a wide range of numerical data by varying the number of digits and the position of the decimal point.

An additional object of the invention is to provide a digital data processing system which is small in size and has a highly reliable level of the performance.

The invention may be summarized as a digital data processing system comprising a numerical data set section having a numerical data input operation unit for setting numerical data with a plurality of digits and a decimal point display unit for displaying the position of the decimal point of the set numerical data, a memory unit for storing the numerical data set by the numerical data input unit, an address designation unit for designating an address of the set numerical data stored in the memory unit; a converter unit for converting an address designating signal from the address designation unit into a predetermined decimal point display signal corresponding to the range of the set numerical data (the range varying according to the number of digits and the position of the decimal point) and applies the converted signal to the decimal point position display unit; and processing unit for reading out the set numerical data from the memory unit and for performing the processing according to the read out set numerical data.

BRIEF DESCRIPTION OF THE DRAWINGS

The above and other objects of the invention will be apparent as the description proceeds, when considered with the accompanying drawings, in which.

A first embodiment of a digital data processing system according to the invention will be described referring to the accompanying drawings.

Figure 1:
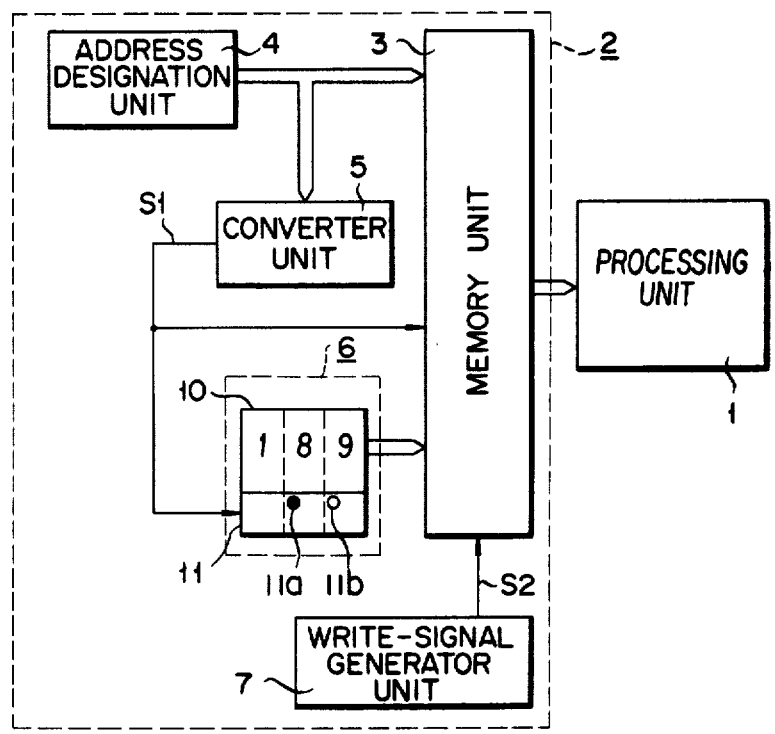
FIG. 1 is a block diagram of a first embodiment of a digital data processing system according to the invention.

FIG. 1 shows a block diagram of a first embodiment of the digital data processing system according to the invention. The description of the embodiment proceeds by using an example where numerical data of three digits within the range $10^{-2}$ to $10^2$, inclusive, is set. In FIG. 1, processing unit 1, comprising a digital computer such as a microcomputer, performs an arithmetic operation necessary for protecting and controlling a system. A numerical data setting section 2 includes a memory unit 3, an address designation unit 4, a converter unit 5, a numerical data input unit 6, and a write signal generator unit 7. The numerical data input section 2 sets and stores the numerical data necessary for the protection and control of the system.

The address designation unit 4 designates addresses for the input numerical data representative of the factors for the system's protection and control, for writing the input numerical data into the memory location of the memory specified by the addresses. The address designation unit 4 is operated, selecting one of the elements of an electric system, which is to be set. In other words, the unit 4 designates the element to be set and generates an output signal designating the element selected.

The address designation unit 4 may be a rotary switch of the known type. The rotary switch can select any one of a plurality of elements and can generate a code representative of the element selected. The code can thus be used as an address value which designates the element selected.

The address value is not outputted from the address designation unit 4 at all times. However, it must be controlled when the processing unit 1 reads the values from the memory unit 3 while the address value is being written into the memory unit 3. The address value may be well controlled by the method hitherto known.

The processing unit 1 reads the values from the memory unit 3 all the time because the values stored in the memory unit 3 are used as references, except during the period the write signal generator unit 7 is generating a write signal S2.

The converter unit 5 receives an address designating signal from the address designation unit 4 to convert the address designating signal into a display signal S1 of 2 bits for representing a setting range of the set numerical data of each factor. The display signal is transferred to the memory unit 3 and the numerical data input unit 6. The converter unit 5 may be constructed of a programmable read only memory (PROM). In this embodiment, each address designating signal corresponds to the set numerical data provided for a respective factor. After receiving the address designating signal, the converter unit 5 converts it into a signal for displaying a decimal point position corresponding to the setting range of the set numerical data specified by the address designating signal.

The numerical data input unit 6 includes a numerical data input device 10 and a decimal point position display unit 11 for displaying a decimal point position on the basis of the display signals received from the numerical data input device 10 and the converter unit 5. The numerical data input unit 6 combines the numerical data from the numerical data input device 10 and the decimal point display signal from the decimal point display unit 11 to set the numerical data in a range falling within 0.00 to 999. The numerical data input device 10 sets numerical data of three places from 000 to 999 step by step. The decimal point display unit 11, when energizing a first decimal point 11a, sets the numerical data in the numerical data input unit 6 into numerical data falling within a range of 0.00 to 9.99. The numerical data shown in FIG. 1 is 1.89. The display unit 11, when energizing a second decimal point 11b, sets the numerical data in the numerical data input unit 6 within a range of 0.0 to 99.9.

Figure 2:
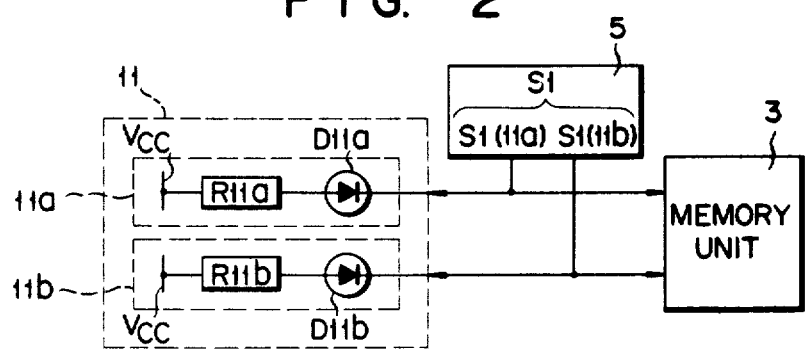
FIG. 2 is a schematic diagram of a decimal point position display unit used in the data processing system in FIG. 1.

FIG. 2 shows a schematic of the decimal point display unit 11 shown in FIG. 2 and its peripheral portion. A first decimal point 11a of the decimal point display unit 11 has a display device D11a connected in series via a resistor R11a to a power source Vcc. A second decimal point 11b is similarly connected in series via a resistor 11b to the power source Vcc. The display devices D11a and D11b, respectively, are supplied with display signals S1 (11a) and S1 (11b) from the converter unit 5. The display signal S1 is inputted into the memory unit 3. Each display signal S1 is a two-bit signal formed by the converter unit 5 by converting the address designating signal.

If the first embodiment of the invention is used to protect and control the above-described distance protection unit, the range of numerical data set to the elements of the distance protection unit may be predetermined as shown in the following Table 1. And the addresses of memory locations for storing the numerical data and the positions of the decimal points of the numerical data may be predetermined as shown also in Table 1.

TABLE 1

| Elements | Range | Address | Display Data |
|---|---|---|---|
| Overcurrent Relay-1 (current) | 0.00–9.99A | 000 | 01 |
| Overcurrent Relay-2 (current) | 00.0–99.9A | 001 | 10 |
| Undercurrent Relay-1 (voltage) | 0.00–9.99V | 010 | 01 |
| Undercurrent Relay-2 (voltage) | 00.0–99.9V | 011 | 10 |
| Distance Relay-1 (impedance) | 000–999 | 100 | 11 |
| Distance Relay-2 (impedance) | 00.0–99.9 | 101 | 10 |
| Timer-1 (time) | 000–999 sec. | 110 | 11 |
| Timer-2 (time) | 0.00–9.99 sec. | 111 | 01 |

The display data which represents the position of the decimal point of each numerical data is displayed by a pair of light-emitting elements D11a and D11b. Each light-emitting element emits light, thus showing a binary digit "1", or emits no light, thus showing a binary digit "0".

Figure 3:
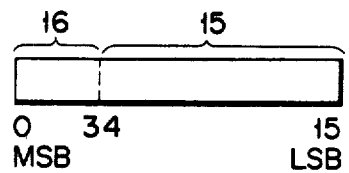
FIG. 3 is an illustration of the format of the data stored in a memory unit shown in FIG. 1.

The set numerical data is loaded into the memory location having an address designated by the address designation unit 4 in the memory unit 3, in response to a value set by the numerical data input device 10 and the decimal point display signal S1 supplied from the converter unit 5. The data format of the data stored in the memory unit 3 is illustrated in FIG. 3. The data format in this example has 16 bits and includes an integer field 15 from the least significant bit (LSB) to the 12th bit as counted from the LSB. The integer field 15 is used for storing three digit of numerical data, e.g., "189", to be set by the numerical data input device 10 in the form of a binary coded decimal (BCD) code. In the case where the numerical data input device 10 is a thumb wheel switch, an output from the switch is a BCD code and is thus directly stored in the integer field 15. In the case of a rotary switch for the device 10, an output signal is applied to the numerical data input device 10 and stored in the integer field 15. In this case, the output signal from the rotary switch is a decimal coded output. The decimal code is converted into a corresponding BCD code by the numerical data input device 10 and then is loaded into the integer section 15. The data format in FIG. 3 further includes a multiplier field 16 from the most significant bit (MSB) to the 4th bit as counted from the MSB and is used for storing the display signals S1 (11a) and S1 (11b).

The write signal generator unit 7 produces a write signal S2 for writing the numerical data set by the numerical data input unit 6 into the memory location of the address in the memory unit 3 specified by the address designation unit 4.

The operation of the digital data processing system thus constructed according to the present invention will be described.

Let us consider a case where 10.0 as the set numerical data is obtained and is stored at the address XY in the memory unit 3. The address designation unit 4 designates the address XY of the memory, first. Upon the designation, the address designation signal is input to the memory unit 3 and to the converter unit 5. The converter unit 5 forms the two-bit display signals S1 (11a)="1" and S1 (11b)="0" on the basis of the address designating signal of the XY, and applies them to the numerical data input unit 6 and the memory unit 3. The decimal point display device 11 of the unit 6, receiving the two-bit signal S1 allows a current flow through the display device D11b to energize the second decimal point 11b. This indicates that the numeral data set by the numerical data input unit 6 ranges from 0.1 to 99.9. In this condition, if the numerical data set operation device 10 sets the numerical data to 100, for example, this implies that 10.0 is set as the set numerical data by the numerical data set unit 6. The numerical data 100 set in the numerical data input device 10 and the signal S1, represent the setting range converted by the converter unit 5, are input the memory unit 3. The write signal S2 is then loaded as an input condition into the memory location defined by the address of the memory unit 3 specified by the address designation unit 4. In this way, the set numerical value or data 10.0 is stored into the memory location of the address specified by the address designation unit 4.

The above-mentioned example is for setting the set numerical data or value 10.0 within a range from 0.1 to 99.9. For setting numerical data within 0.01 to 9.99, the two-bit signal S1 for the decimal point display is set to "0" and "1", S1 (11a)="0" and S1 (11b)="1", and to the display device 11a is lighted. For setting numerical values within a range from 1 to 999, S1 (11a)="1" and S1 (11b)="1" and the decimal point display device 11 is in an extinguished state.

As seen from the foregoing description, the numerical data for a variety of factors for the system's protection and control may be set, to given numerical data, by using a single numerical data input unit 6 and the combination of the numerical value or data in the numerical data input device 10 and the decimal point displayed by the decimal point display unit 11, and further the numerical data within a wide numerical range, 0.00 to 999, for example, may be set with a small number of bits. Accordingly, the numerical data setting is possible without using a plurality of numerical data input units provided for the respective factors for the system protection and control. Further, all the numerical data from the minimum value to the maximum value may satisfactorily be input by a single numerical data set unit with a small number of bits. As a result, the numerical data input unit per se may be made small and thus the digital data processing unit may be made small in size. The use of the single numerical data input simplifies the maintenance and inspection of the system and improves the reliability. The converter unit 5 is comprised of a programmable component such as a read only memory. Accordingly, the setting range of the system may be widely be varied by replacing the converter unit 5 by a new one with a corresponding memory capacity. This enables the numerical data setting section 2 to be standardized in hardware. Moreover, the setting range of a particular numerical data is determined solely by the factor, thus resulting in the improvement of the numerical data setting operation.

The second embodiment of the digital data processing system according to the invention will be described referring to FIGS. 4 and 5.

Figure 4:
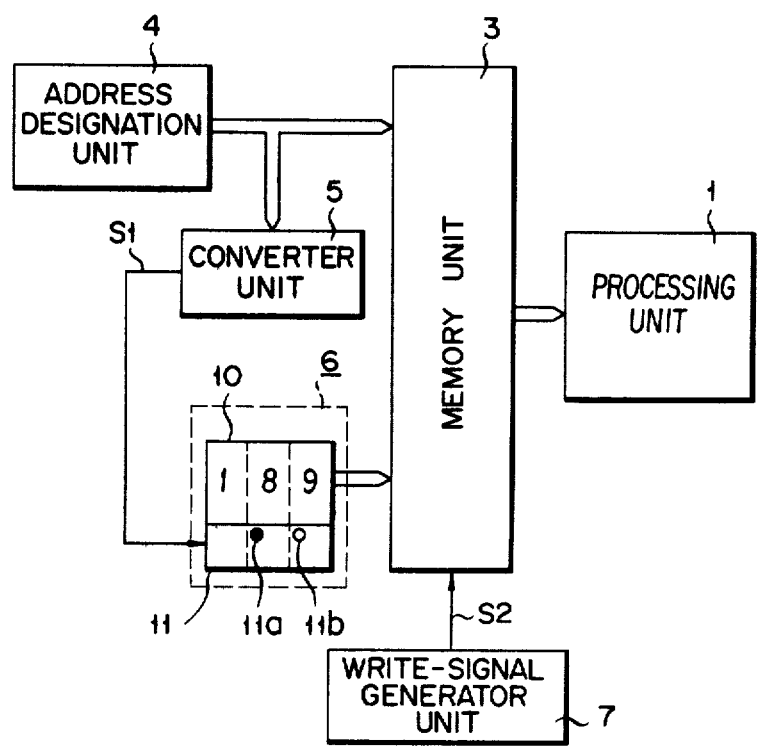
FIG. 4 is a block diagram of a second embodiment of the digital data processing system according to the invention.

FIG. 4 is a schematic diagram of the second embodiment according to the invention. In the figure, like symbols are used to designate like parts and portions in FIG. 1. The major difference between the second embodiment and the first embodiment is that the output of the converter unit 5 is input to the memory unit 3. The display signal S1 obtained by converting the output from the address designation unit 4 by the converter unit 5, that is, a signal representing a decimal point of the set numerical data, is already known. Accordingly, the information included in the display signal S1 may be preset in a program used in the processing unit 1. If this is done, it is possible to omit the display signal S1 output to the memory unit 3. The format of the data stored in the memory unit 3 is illustrated in FIG. 5. In the case of the FIG. 5 embodiment, no display signal is input from the converter unit 5 to the memory 3, so that the multiplier field 16 is omitted and "0" is loaded into the empty field. If necessary, "1" may be loaded into the empty field of course. The circuit construction as mentioned above may attain the effects similar to those of the first embodiment.

Figure 6:
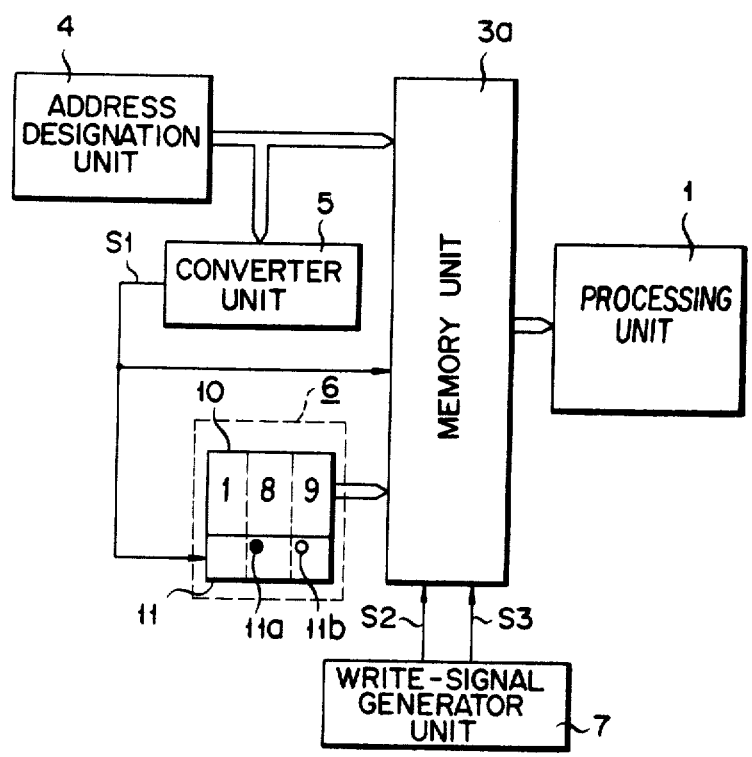
FIG. 6 is a block diagram of a third embodiment of the digital data processing system according to the invention.
Figure 7:
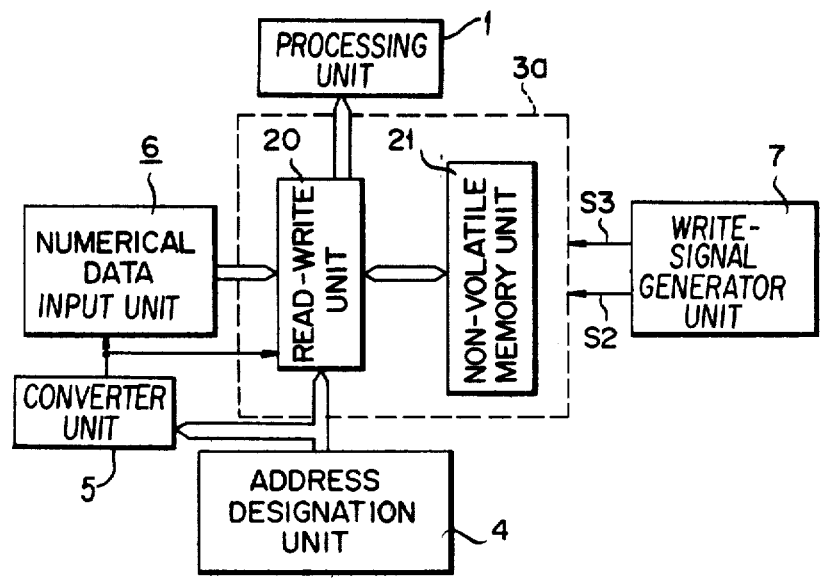
FIG. 7 is a block diagram of a memory unit used in the third embodiment in FIG. 6.

A third embodiment of the digital data processing system according to the invention will be described referring through FIGS. 6 to 8. FIG. 6 is a block diagram of a third embodiment of the digital data processing system according to the invention. Also in FIG. 6, like symbols are used to designate like parts or portions in FIG. 1. In FIG. 6, a memory unit 3a formed by a non-volatile memory corresponds to the memory unit 3 in FIG. 1. The memory unit 3a is controlled by a write signal S2, outputted from the write signal generator unit 7a, and a non-volatile control signal S3. The memory unit 3a and its peripheral portion are illustrated in FIG. 7. As shown, the memory unit 3a is comprised of a read/write unit 20 and a non-volatile unit 21. The read/write unit 20 is a standard random access memory allowing data to be read and data to be written. The non-volatile unit 21 is capable of holding data when a power supply is off and thus can hold data written therein even if the power is discontinued. When power from of the power supply is restored, the data is read out from the non-volatile unit 21 into the read/write unit 20 for the necessary data processing.

Figure 8:
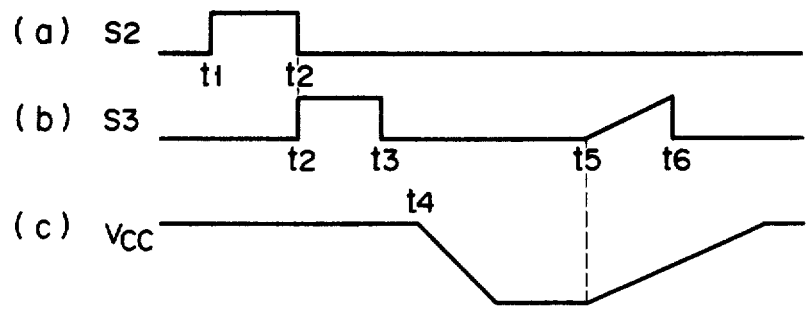
FIG. 8 is a set of timing diagrams useful in explaining the control of the memory unit in FIG. 6.

The control of the memory unit 3a thus constructed is performed as shown in FIG. 8. FIG. 8 is a set of timing charts useful in explaining the control of the memory unit 3a. In FIG. 8, (a) represents a write signal S2, (b) a non-volatile control signal S3 and (c) a variation of the voltage from the power source Vcc. As shown in FIG. 8(a), the write signal S2 becomes logical "1" during a period of time from t1 to t2, the set numerical data in the numerical data set unit 6 is loaded into the read/write unit 20 in the memory unit 3a in accordance with the address signal from the address designating unit 4. Following the write signal S2, the non-volatile control signal S3 becomes "1", during a period of time t2 to t3, so that the set numerical data having been loaded into the read/write unit 20 is written into the non-volatile unit 21. With the data write, it is possible to load the set numerical data into the memory unit 3a even at a time when power is discontinued. Assume that the voltage of the power source Vcc drops at time t4 and it starts to return to its original state at time t5. In this case, by producing a non-volatile control signal S3 proportional to the rise of the voltage from the power source Vcc, during a period of time from t5 to t6, the set numerical data stored in the non-volatile unit 21 is read out into the read/write unit 20. Upon reading out the data into the read/write unit 20, the set numerical data may be used immediately after the power source is restored, before the power source voltage falls.

As described above, the use of the non-volatile memory for the memory unit 3a keeps the set numerical data stored in the memory unit 3a even when the power is discontinued and requires no resetting of the numerical data after the power source is restored, for restarting the system. The use of the memory unit 3a shown in FIG. 7 enables the set numerical data to be held even in the case of a power source failure. The memory unit 3a may use the data format shown in FIG. 3, like the first embodiment.

The fourth embodiment of the digital data processing system according to the present invention will be described.

Figure 9:
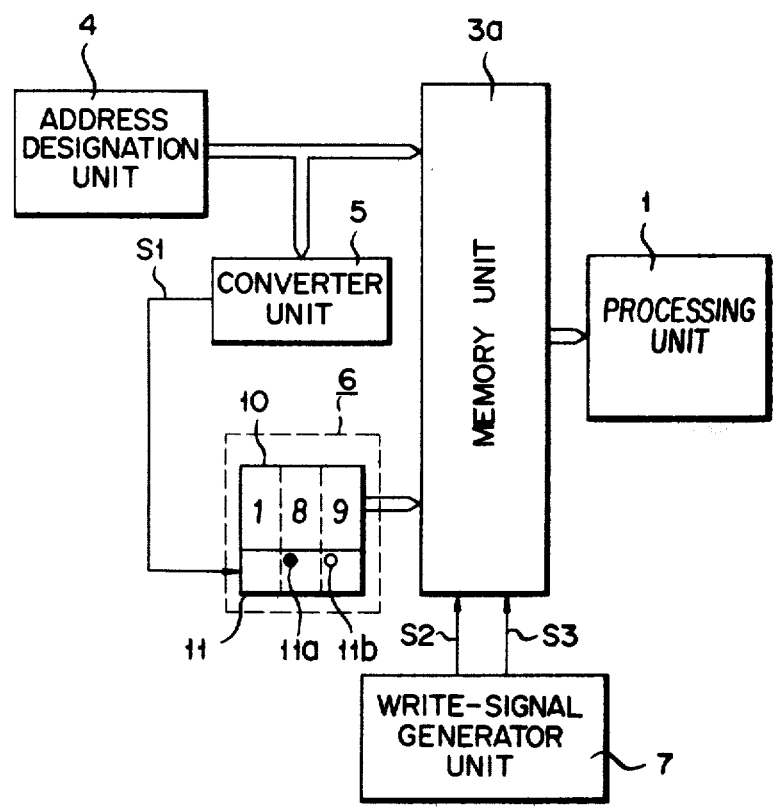
FIG. 9 is a block diagram of a fourth embodiment of the digital data processing system according to the invention.

The embodiment shown in FIG. 9 corresponds to FIG. 6 in which no output from the converter 5 is applied to the memory unit 3a of FIG. 6. In FIG. 9, like symbols designate like or equivalent parts or portions in FIG. 6. It is evident that the control by the write signal S2 produced from the write signal generator 7 and the non-volatile control signal S3 are exactly the same as that as described referring to FIGS. 7 and 8. Accordingly, the circuit construction shown in FIG. 9 can hold the set numerical data even in the case of a power source failure.

The explanation to follow is the elaboration of the fifth embodiment of the digital data processing unit according to the invention.

Figure 10:
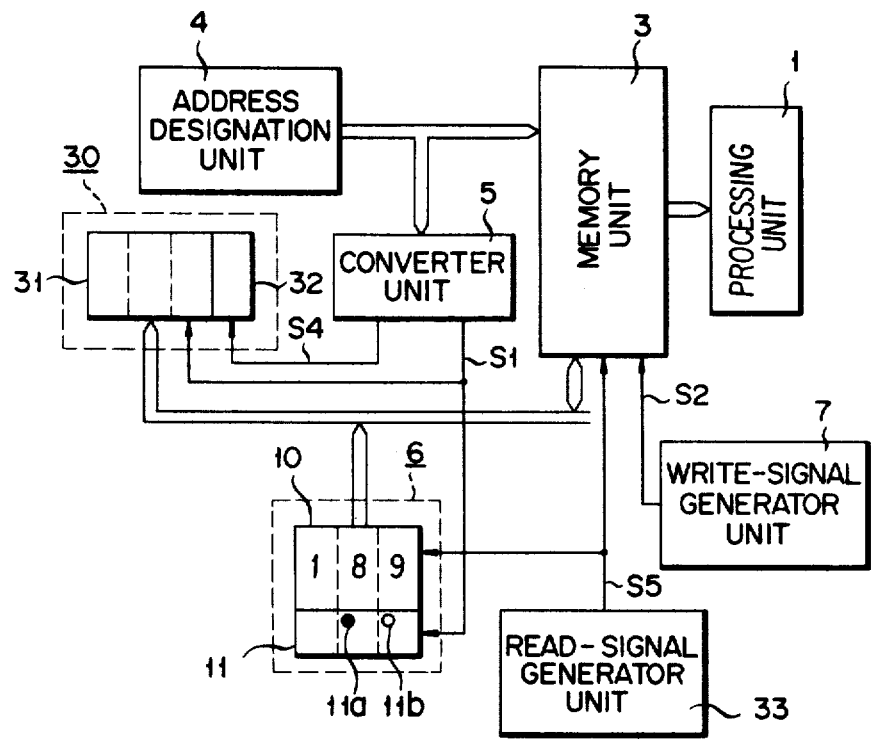
FIG. 10 is a block diagram of a fifth embodiment of the digital data processing system according to the invention.

FIG. 10 shows a block diagram of the fifth embodiment of the invention. The embodiment shown in FIG. 10 corresponds to the embodiment in FIG. 1 with an additional display unit 30 for displaying the numerical data set in the numerical data input unit 6 and stored in the memory unit 3 in FIG. 3 and a unit of the set numerical data as well. In FIG. 10, the display unit 30 includes a set numerical data display device 31 and a unit display device 32. The numerical data display device 31 receives an output signal from the numerical data input unit 6, an output signal from the memory unit 3, and a decimal point display signal S1 from the converter 5, and displays the set numerical data in the numerical data input unit 6 or stored in the memory unit 3. The unit display device 32 displays a unit of the set numerical data by receiving a unit display signal S4 output from the converter unit 5.

Figure 11:
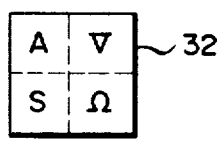
FIG. 11 is a front view of a unit display section used in the fifth embodiment in FIG. 10.

FIG. 11 shows a front view of the unit display device 32 for displaying four units, A (ampere), V(volt), S(time), and Ω(Ohm). In operation, only the selected unit of those four is energized while the remaining ones are not energized.

Figure 12:
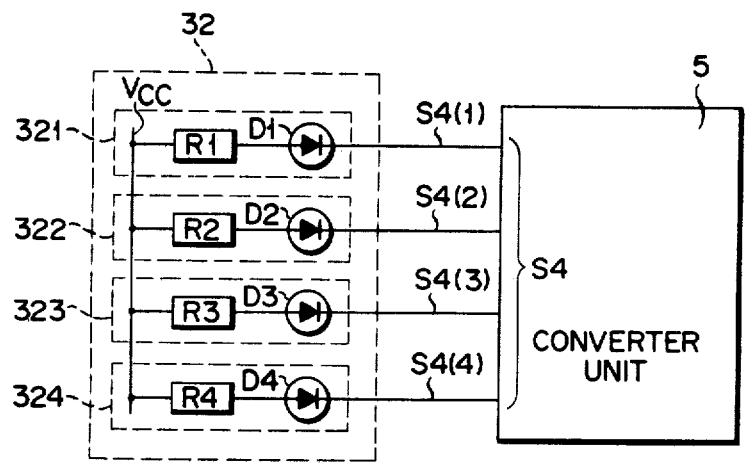
FIG. 12 is a schematic diagram of the unit display section used in FIG. 10.

FIG. 12 is a schematic diagram of the unit display device 32 for displaying the four units shown in FIG. 11. Display circuits 321 and 324 are used for displaying the units A, V, S and Ω, respectively. Those circuits, respectively, include display devices D1 to D4 connected in series through resistors R1 to R4 to the power source Vcc. Unit display signals of four bits S4(1), S4(2), S4(3), and S4(4) are applied to the display circuits 321 to 324, respectively.

In FIG. 10, a read signal generator 33 produces a read signal S5 which in turn is applied to the memory unit 3 to read out the set numerical value stored therein and to stop the outputting of the numerical data input unit 6. The remaining components shown in FIG. 10 are the same as those shown in FIG. 1 and like numerals are used for designating those.

The operation of the display unit 30 in FIG. 10 will be described. The display of the set numerical data in the numerical data input unit 6 is explained hereinafter. The set numerical data in the unit 6 is input to the memory unit 3 in the BCD code of three places as described in referring to FIG. 1. The output signal from the numerical data input unit 6 is supplied to the set numerical data display device 31 where it is displayed. The decimal point display signal S1 outputted from the converter unit 5 is supplied to the decimal point display device 11 and the set numerical data display device 31 as well. Accordingly, the set numerical data display device 31 directly displays the input numerical data in the numerical data set input 6. The unit display device 32 displays a unit display signal S4, which is a conversion of the address designating signal S4 from the address designation unit 4, the conversion being done by the converter unit 5. The conversion of the address designating signal is the same as the production of the decimal point display signal S1 as described in referring to FIG. 1. If a factor to be set is given, the unit of the set numerical value or data is also determined. Accordingly, the above conversion is performed by previously designing the converter unit 5 so that the unit display signal S4 is produced in accordance with the address designating signal applied to the converter unit 5. Therefore, the converter unit 5 is so set as to produce the decimal point display signal S1 and the unit display signal S4 in accordance with the address designating signal.

The operation of the unit to display device displays a unit of the set numerical data will be described hereinafter. The display devices 321 to 324 are illuminated when the unit display signals S4(1) to S4(4) are "0". For displaying A, for example, the unit display signals S4 are: S4(1)="0", S4(2)=S4(3)=S4(4)="1".

Let us consider a case where a factor corresponding to the address XY in the memory unit 3 is set to the set numerical data 10.0 A. The output signal S1, as the decimal point display signal, from the converter unit 5 are S1(11a)="1" and S1(11b)="0", for the factor to be set, as described in paragraph of the operation in referring to FIG. 1. Accordingly, the converter unit 5, when receiving the address XY, produces the decimal point display signal S1 and the unit display signal S4; S1(11a)="1" and S1(11b)="0", S4(1)="0", S4(2)="1", S4(3)="1" and S4(4)="1". The setting operation in the numerical data input unit 6 is as described in referring to FIG. 1. In the display unit 30, the set numerical data display device 31 receives the BCD code of the places of the set numerical value of data 100 in the numerical data input unit 6 and the decimal point display signal S1(11a)="1" and S1(11b)="0", to display 10.0. The unit display device 32 receives the unit display signal S4 having a value to display A. The set numerical data in the numerical data set unit 6 is displayed in this way.

The displaying of the set numerical data stored in the memory unit 3, will now be described. Firstly, the address of the memory unit 3 corresponding to a factor whose set numerical value is desired to be read out, is set in the address designation unit 4. Upon the address designation, the address designating signal is input to the memory unit 3 and the converter unit 5. The converter unit 5 responds to the address designating signal to produce a decimal point display signal S1 and a unit display signal S4, both corresponding to the selected factor. Those output signals are applied to the display unit 30. Then, a read signal S5 produced from the read signal generator unit 33 inhibits the output from the numerical data input unit 6. At the same time, the memory unit 3 produces the set numerical data corresponding to the address in the form of a BCD code of three places which in turn is input to the display unit 30. Through the above-mentioned operation, the stored numerical data corresponding to the address set in the address designation unit 31 is displayed with its unit.

As described above the input numerical data or value, in the numerical data set unit 6 is directly displayed, so that the set numerical data may be checked in the course of the setting operation, while at the same time it is possible to monitor a failure of the numerical data input unit 6. The set numerical data stored in the memory unit 3 may be read out therefrom, and the read out data may be displayed with its unit. Therefore, the operation and maintenance of the numerical data setting system is easy.

The display unit 30 of the fifth embodiment in FIG. 10 may be incorporated into the embodiments shown in FIGS. 4, 6 and 9, similarly. In this case, the converter 5 may be designed to produce a display signal in the unit displayed device 32, as explained in the foregoing description. Thus, the display unit 31 may be applied to any other relevant systems, and not limited to the FIG. 10 embodiment. The display unit 30 may be constructed of only one of the set numerical data display devices 31 and one unit display device 32, as a modification. The units to be displayed are not limited to the four units A, V, S and Ω, as in FIGS. 11 and 12.

Figure 13:
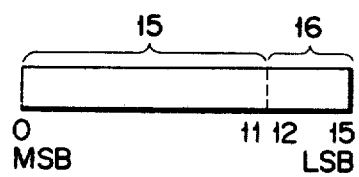
FIG. 13 is a modification of the data format shown in FIG. 3.

FIG. 13 shows a modification of the data format shown in FIG. 3. The data format shown in FIG. 13 is comprised of 16 bits and a field from the most significant bit (MSB) to the 12th bit is an integer field. A multiplier field ranges from the least significant bit (LSB) to the 4th bit as counted from the LSB.

Figure 5:
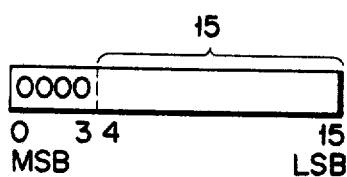
FIG. 5 is an illustration of the format of the data stored in a memory unit used in the second embodiment in FIG. 4.
Figure 14:
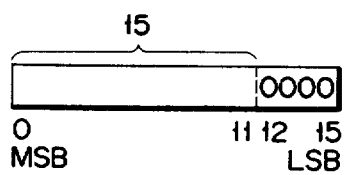
FIG. 14 is a modification of the data format shown in FIG. 5.

FIG. 14 shows a modification of the data format shown in FIG. 5. In the format in FIG. 14, "0" is loaded in the field corresponding to the multiplier field 16 in FIG. 13. "1" may be set therein in place of "0", if necessary.

The data format of 16 bits, having the integer field 15 of 12 bits and the multiplier field 16 of 14 bits, may be substituted by any other data format if it is capable of the set numerical value. The invention, which has been described with respect to numerical data of three places set by the numerical value set operation unit 10, is applicable for the appropriate number of places of the set numerical data and the number of bits of the decimal point display signal. The invention is also applicable for numerical data with two places, as a matter of course. Although the unit dislay device 32 shown in FIG. 11 is one of the two divided display sections of the display face, any other suitable display unit may be used for the unit display, such as display unit capable of 16-segment display by the dot-matrix display or LED elements. As a further modification of the invention, a code converting circuit for converting the BCD code to the pure binary code is inserted between the numerical data set unit and the memory unit or between the memory unit and the processing unit in each embodiment as mentioned above.

What is claimed as new and desired to be secured by Letters Patent of the United States is:

1. A digital data processing system for protecting and controlling an electric system, comprising;
    a setting section for setting a plurality of data values, comprising,
    an address designation unit for generating address signals corresponding to respective of the data values,
    a converter unit connected to receive the address signals for generating predetermined decimal point signals in correspondence to respective of the addres signals,
    numerical data input means for generating numerical data signals representative of said data values and characterized by a predetermined number of digits, said data signals associated with respective of said address signals, each decimal point signal generated by said converter unit defining a predetermined position of a decimal point within said digits of a respective data signal,
    decimal point display means connected to said converter unit and receiving therefrom said decimal point signals for displaying for each decimal point signal a position of a decimal point corresponding thereto, said decimal point display means being provided between said digits of said numerical data input means,
    a write-signal generator unit for generating a write-signal, and
    a memory unit connected to receive the address signals, decimal point signals, data signals and write-signal for storing each decimal point signal and each respective data signal at a respective address designated by the address signals, in response to the write-signal; and,
    a processing unit connected to said memory unit for reading said plurality of data signals and decimal point signals from the memory unit and processing the corresponding data values to protect and control the electric system based thereon.

2. A digital data processing system for protecting and controlling an electric system, comprising:
    a setting section for setting a plurality of data values, comprising,
    an address designating unit for generating address signals corresponding to respective of the data values,
    a converter unit connected to receive the address signals for generating predetermined decimal point signals in correspondence to respective of the address signals,
    numerical data input means for generating numerical data signals representative of said data values, said numerical data signals characterized by a predetermined number of digits, said numerical data signals associated with respective of said address signals,
    decimal point display means connected to receive the decimal point signals for displaying for each said decimal point signal a position of a decimal point corresponding thereto, said decimal point display means being provided between each digit of said numerical data input means,
    a write-signal generator unit for generating a write-signal, and a memory unit connected to receive the address signals, data signals and write-signal for storing each data signal at a respective address designated by the address signals, in response to the write-signal, wherein each address signal addresses a memory location which is assigned a predetermined decimal point position the same as that displayed by said decimal point display means; and, a processing unit connected to the memory unit for processing and controlling the electric system, said processing unit having means for reading the data signals stored in said memory unit, for determining a position of a decimal point of each data value based on the address of each respective data signal in said memory unit, for determining said data value based on the result of said data signal and said decimal point position, and for processing the determined data values to protect and control said electrical system using said data value.

3. A digital data processing system according to claim 1, further comprising:

digit display means for displaying the digits represented by said data signals; and said decimal point display means displaying said decimal point signals in relation to said digits displayed by said digit display means.

4. A digital data processing system according to claim 2, comprising:

digit display means for displaying the digits represented by said data signals, said decimal point display means displaying said decimal point signals in relation to the displayed digits.

5. A digital data processing system according to claims 3 or 4, wherein said decimal point display means comprises:

a plurality of series circuits each including a display section connected through a resistor to a power source and each connected to receive a decimal point signal from the converter unit.

6. A digital data processing system according to claims 3 or 4, comprising:

said converter unit including means for generating predetermined unit display signals based on respective of said address signals; and unit display signal means for displaying said unit display signals.

7. A digital data processing system according to claim 6, wherein said unit display means comprises:

a plurality of unit display circuits each including a display section connected through a resistor to a power source and each connected to receive a unit display signal from the converter unit.

8. A digital data processing system according to claims 1 or 2, wherein said memory unit comprises:

a read/write unit which is controlled by the write-signal and a non-volatile control signal also generated by said write-signal generator unit to read and write said data signals; and a non-volatile memory unit connected to receive the data signals from the read/write unit in accordance with the non-volatile control signal, said non-volatile memory unit holding said data signals even in the event of power supply failure and supplying the data signals to said read/write unit when the power supply is resumed.

* * * * *